July 4, 1939.   A. KNOTZ   2,164,528
MONEY PLATE
Filed Dec. 14, 1935
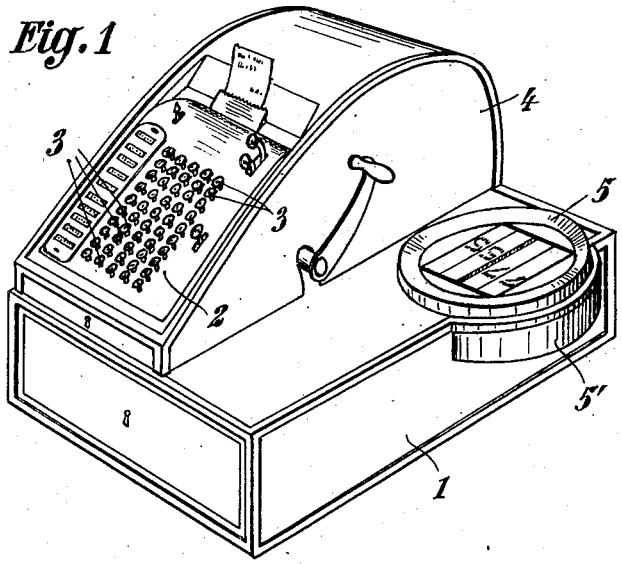
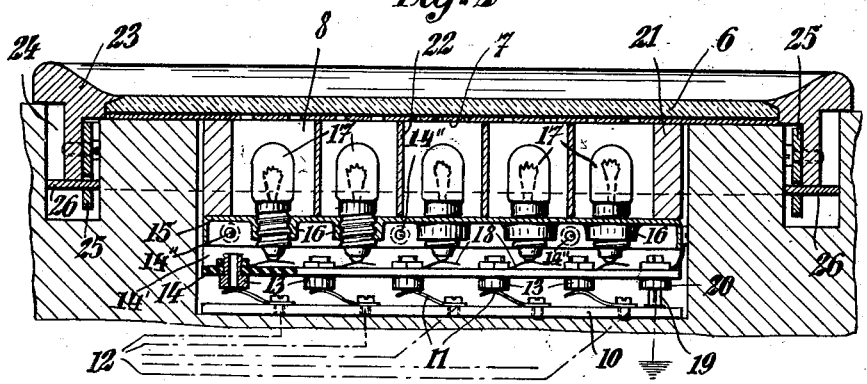
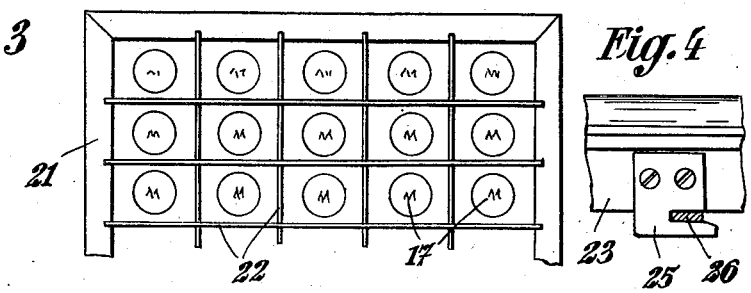
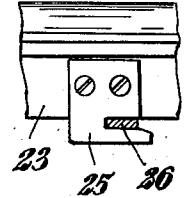
Inventor
Alois Knotz
By Knight Bros
his attorneys Patented July 4, 1939

2,164,528

UNITED STATES PATENT OFFICE 2,164,528

MONEY PLATE

Alois Knotz, Graz, Austria

Application December 14, 1935, Serial No. 54,479
In Austria December 14, 1934

2 Claims. (Cl. 177—326)

This invention relates to money plates of the type used on counters to facilitate the giving and receiving of payment and change, and has for its object to enable both the buyer or customer and also the salesman or cashier to keep check on the amount of money to be paid by the customer in a particularly effective manner.

In accordance with the invention there is provided within the money plate an indicating device for signalling the amount payable by the customer in a visible form on the disc of the plate, this device being adapted to be operated from the key-board of a cash register or the like. The indicating device itself may consist in a known manner, for instance as shown in U. S. Patent No. 1,960,636 and British Patent No. 385,512, of rows of electric lamps associated with rows of keys on a cash register or the like, and adapted to light up in accordance with the setting of these keys, to cause the amount to which the keys are set to appear in illuminated numerals, for example by means of a stencil on the disc of the money plate, the disc being made of transparent or translucent material for this purpose. The money plate according to the present invention can also with advantage be directly attached to or arranged to form part of a cash register.

A form of construction embodying the invention is shown, by way of example, in the accompanying drawing, in which:

Fig. 1 is a perspective view of a cash register having a money plate in accordance with the present invention attached to it.

Fig. 2 is a vertical section of the money plate. Figs. 3 and 4 show details.

Referring to the drawing, the cash register shown by way of example to illustrate the invention consists of a base portion 1 with a drawer and a superposed calculating machine 2 of conventional design the keys 3 of which are adapted in a known manner, for instance in the manner shown in the said U. S. and British Patents, to serve both for the setting of calculating and indicating mechanism and also for the closing of lamp circuits. The calculating machine is covered over by a lock-controlled lid 4 which leaves nothing but the setting means and the operating crank handle free. To one side of the covered superstructure and adjoining the base portion there is provided a money plate 5, the part thereof projecting from the base portion of the cash register being supported from beneath by a suitable extension 5'. The money plate 5 is provided with a glass disc 6 the under side of which is subdivided into columns according to the units of the currency concerned, and beneath this glass there is provided a stencil 7 (see Fig. 2) bearing or otherwise showing the numerals required for indication. Beneath the area of the glass plate 6 bounded by the marginal line round the dividing marks there is a recess 8 in the casing or base portion of the money plate at the bottom of which there is secured a plate 10 of insulating material furnished with spring contact tongues 11 each of which is connected by a cable 12 to the key of the calculating machine appropriate to the corresponding numeral on the stencil 7. Against the spring contact tongues 11 bear contact studs 13 extending through and fixed to a plate 14 of insulating material. The plate 14 has upwardly turned flanges, one of which appears at 14', which are connected by screws 14" to plate 15. Into holders 16 on the plate 15 there are screwed miniature electric lamps 17 which bear against contact springs 18 proceeding from the studs 13, and which are thus conductively connected to the cables 12 in a manner permitting of ready detachment. The plate 10 is provided with an earthed connecting plug 19 which fits into a socket 20 on the plate 14 when this latter is placed in position, the said socket being conductively connected to the plate 15 by a wire 30. Above the plate 15 there is secured a frame 21 which carries a lattice-work 22 of partitions between the lamps, and which bears against the under side of the stencil 7. The glass disc 6 and the stencil 7 are held in position by means of a ring 23 which engages in an annular groove 24 in the sub-structure 1, and which can be secured in position by means of the hook-shaped fasteners 25 (see Fig. 4) provided at opposite points on the ring 23 and adapted to engage transverse members 26 pertaining to the sub-structure. In view of the rigid connection of plates 15 and 14 by flange 14', the plate 14 is pressed down when the cover 6, 23 is mounted on the base, causing studs 13 to bear against contacts 11.

In order to keep the money plate down to the usual size, while at the same time using relatively large numerals for the required indication, the lamps allotted to one digit denomination are disposed in two adjacent series in a known manner, as shown in Fig. 2 of U. S. Patent No. 1,960,636, for which reason only five lamps are shown in Fig. 2.

As the amount is registered on the key-board of the calculating machine the keys act as switches for the different circuits and the corresponding numbers are caused to light up on the money plate. If desired, the stencil 7 can be so made that the different digit denominations appear in different colours, as an aid for instance in distinguishing the different currency denominations. By thus arranging for the indication of the registered amount to take place at the money plate the persons concerned are more effectually notified as to the amount in question than with the usual indicators, since they cannot overlook the surface of the money plate over which payment and the giving of change take place.

It is to be understood that the invention is not restricted to or by the constructional example described and shown in this specification. Thus for example the money plate could be attached to the cash register in a different position from that shown, or could be completely detached from the cash register except for the current conductors.

I claim:

1. In a money plate adapted to be associated with a cash register, a box comprising a base and a cover, said cover consisting of a translucent plate and means for exhibiting rows of numbers thereon, said base containing a plate having rows of sockets for electric lamps, means for segregating said lamps, a second plate below said first plate bearing rows of electrical contacts for engagement respectively with electric lamps mounted in said sockets, said plates being fixed together so as to be removable together from said base, a second set of contacts fixed in said base and engaging resiliently with the electrical contacts in said second plate, and means for connecting said cover to said base to press said electrical contacts in said second plate against the contacts fixed in said base whereby the resiliency of the contacts maintains a tight association of the parts.

2. In a money plate adapted to be associated with a cash register, a box comprising a base and a cover, said cover consisting of a translucent plate and means for exhibiting rows of numbers thereon, said base containing a lamp holder comprising a plate with lamp sockets arranged in rows corresponding to said rows of numbers and a second plate with contacts for respectively engaging lamps in said sockets, said lamp holder being detachable as a unit, and a second set of contacts fixed in said base and engageable respectively with the contacts on said second plate; and a ring provided with means for engagement with said base to hold said cover to said base and to press said sets of contacts into engagement with each other to maintain a tight association of the parts.

ALOIS KNOTZ.